(12) United States Patent
Pattok et al.

(10) Patent No.: US 10,112,593 B2
(45) Date of Patent: Oct. 30, 2018

(54) POWER ASSIST SYSTEM WITH BALL NUT, BRAKE BOOST ACTUATOR, AND METHOD

(71) Applicant: STEERING SOLUTIONS IP HOLDING CORPORATION, Saginaw, MI (US)

(72) Inventors: Eric D. Pattok, Frankenmuth, MI (US); John S. Beam, Freeland, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 150 days.

(21) Appl. No.: 15/222,349

(22) Filed: Jul. 28, 2016

(65) Prior Publication Data

US 2017/0028976 A1  Feb. 2, 2017

Related U.S. Application Data

(60) Provisional application No. 62/197,810, filed on Jul. 28, 2015.

(51) Int. Cl.
*B62D 5/04* (2006.01)
*B60T 13/74* (2006.01)

(52) U.S. Cl.
CPC .......... *B60T 13/745* (2013.01); *B62D 5/0448* (2013.01); *B60T 13/746* (2013.01)

(58) Field of Classification Search
CPC .... B62D 5/0448; B60T 13/745; B60T 13/746
See application file for complete search history.

(56) References Cited

U.S. PATENT DOCUMENTS

| | | | |
|---|---|---|---|
| 4,145,934 A | 3/1979 | Sragal | |
| 4,516,962 A | 5/1985 | Brandenstein et al. | |
| 4,571,222 A | 2/1986 | Brandenstein et al. | |
| 5,702,317 A | 12/1997 | Kawashima et al. | |
| 9,314,835 B2 * | 4/2016 | Kitamura | B21K 1/64 |
| 2002/0189888 A1 * | 12/2002 | Magnus | B62D 5/006 180/402 |
| 2003/0024245 A1 * | 2/2003 | Fulks | B60T 13/745 60/545 |
| 2004/0104067 A1 * | 6/2004 | Fishbach | B62D 5/0424 180/444 |

(Continued)

FOREIGN PATENT DOCUMENTS

| | | |
|---|---|---|
| CN | 201137680 Y | 10/2008 |
| CN | 104417606 A | 3/2015 |

OTHER PUBLICATIONS

CN English Translation of Chinese Office Action and Search Report for Chinese Application No. 201610836449.0 dated Mar. 27, 2018, 7 pages.

(Continued)

*Primary Examiner* — Anne Marie M Boehler
*Assistant Examiner* — Marlon A Arce
(74) *Attorney, Agent, or Firm* — Cantor Colburn LLP

(57) ABSTRACT

A power assist system includes a motor having a rotor shaft, a drive pulley attached to the rotor shaft, a driven pulley, a flexible belt configured to connect the drive pulley to the driven pulley, and a ball screw assembly. The ball screw assembly includes a rotatable ball screw rotatable with the driven pulley, a linearly translated ball nut surrounding the ball screw, and an anti-rotation device arranged to prevent rotation of the ball nut.

19 Claims, 11 Drawing Sheets

(56) References Cited

U.S. PATENT DOCUMENTS

| | | | |
|---|---|---|---|
| 2005/0098376 A1* | 5/2005 | Ozsoylu | B62D 5/0421 180/444 |
| 2007/0089926 A1* | 4/2007 | Jo | B62D 5/04 180/443 |
| 2008/0011537 A1* | 1/2008 | Ozsoylu | B62D 5/04 180/422 |
| 2015/0060188 A1 | 3/2015 | Kitamura et al. | |

OTHER PUBLICATIONS

CN Chinese Office Action and Search Report for Chinese Application No. 201610836415.1 dated Mar. 20, 2018, including English translation, 14 pages.

* cited by examiner

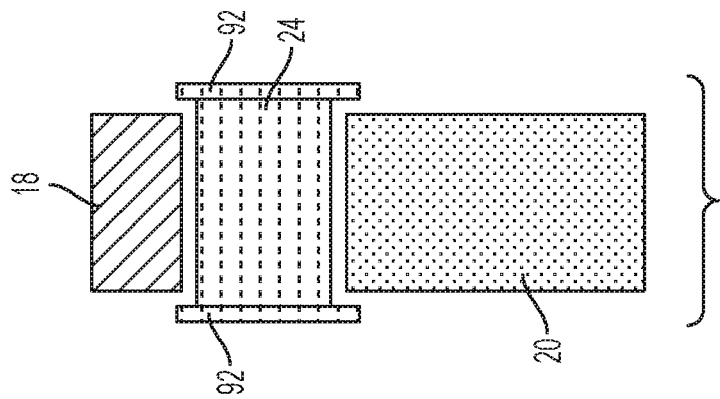
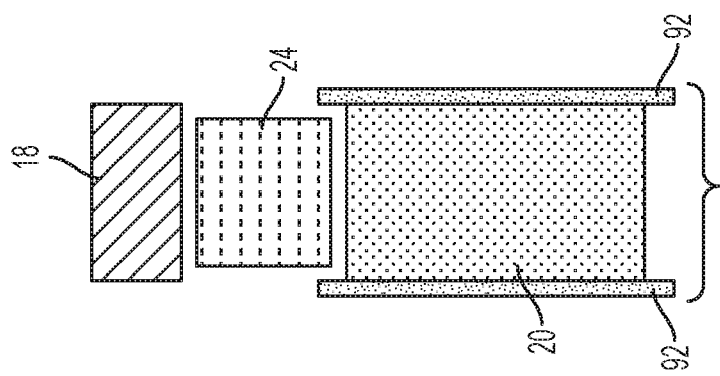
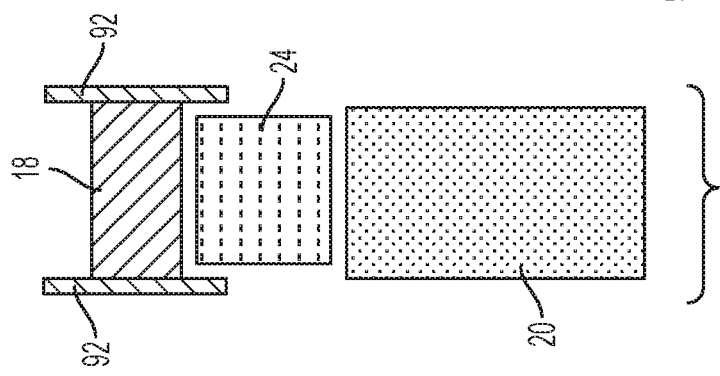
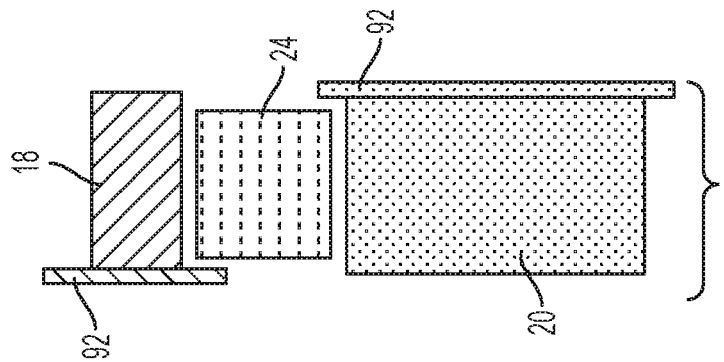

POWER ASSIST SYSTEM WITH BALL NUT, BRAKE BOOST ACTUATOR, AND METHOD

CROSS-REFERENCE TO RELATED APPLICATIONS

This application claims the benefit of U.S. Provisional Application Ser. No. 61/197,810, entitled "Power Assist System with Ball Nut, Brake Boost Actuator, and Method", filed Jul. 28, 2015, under 35 U.S.C. § 119(e), and which is incorporated herein by reference in its entirety.

FIELD OF THE INVENTION

The following description relates to a power assist system having a pulley ball nut, and, more specifically, to improved packaging for a ball screw and ball nut within the power assist system.

BACKGROUND

Master cylinders are in wide use in various industries, but particularly in the motor vehicle industry where they serve in conjunction with an associated slave or wheel brake cylinder located at each of the wheels of the vehicle. Each wheel brake cylinder is supplied with pressurized fluid when an operator depressing the brake pedal of the vehicle actuates the master cylinder. Although manual actuation of the master cylinder can be effective to produce the desired resultant action at the associated brake cylinder, often it is desirable to provide power-assist operation of the master cylinder.

Many current brake systems include such a power-assist feature using engine vacuum to boost the operation of the master cylinder. In a system where engine vacuum is not available, such as in an electric-powered vehicle, it would be desirable to provide a brake boost feature that provides similar functionality as that of vacuum or other boost schemes. Some boosters have provided a master cylinder having a non-vacuum boost feature in combination with a manual actuation feature in order to ensure continuous operation of the brake system in the event the boost feature becomes disabled. These boosters utilize a linearly translated ball screw to engage with the master cylinder. A ball nut rotates and transmits power from a driven pulley to the ball screw. The ball nut is supported by a ball nut bearing. This arrangement requires a very large bearing over the ball nut, and the bearing diameter and motor diameter force a further center to center distance of ball screw and motor, resulting in large overall packaging of the booster.

It is desirable to provide a power assist system with a ball nut and ball screw arrangement that provides a smaller package that is more cost effective and less noisy than conventional power assist systems.

SUMMARY OF THE INVENTION

A power assist system includes a motor having a rotor shaft, a drive pulley attached to the rotor shaft, a driven pulley, a flexible belt configured to connect the drive pulley to the driven pulley, and a ball screw assembly. The ball screw assembly includes a rotatable ball screw rotatable with the driven pulley, a linearly translated ball nut surrounding the ball screw, and an anti-rotation device arranged to prevent rotation of the ball nut.

An electric power steering system includes the above-described power assist system and a steering gear assembly, wherein rotation of the driven pulley by the drive pulley operates a driven shaft operatively engaged with the steering gear assembly.

A brake boost actuator includes a power assist system including a motor having a rotor shaft, a drive pulley attached to the rotor shaft, a driven pulley, a flexible belt configured to connect the drive pulley to the driven pulley, and a ball screw assembly. The ball screw assembly includes a rotatable ball screw rotatable with the driven pulley, a linearly translated ball nut surrounding the ball screw, and an anti-rotation device arranged to prevent rotation of the ball nut. The brake boost actuator further includes a master cylinder including a reservoir and a piston, rotation of the ball screw by the driven pulley being converted to linear motion of the piston through the ball nut.

A method of linearly translating a driven shaft by a power assist system, the method includes arranging a pulley assembly between a housing and cover of the power assist system, the pulley assembly including a drive pulley rotatable about a first longitudinal axis, a driven pulley, a flexible belt configured to connect the drive pulley to the driven pulley; connecting the driven pulley to a ball screw for rotating the ball screw with the driven pulley; assembling a ball nut with an anti-rotation device on the ball screw; and, attaching the driven shaft to the ball nut.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIGS. 7-10 are schematic views of various embodiments of the pulley assembly having an axial trap for the power assist system;

DETAILED DESCRIPTION

Figure 1:
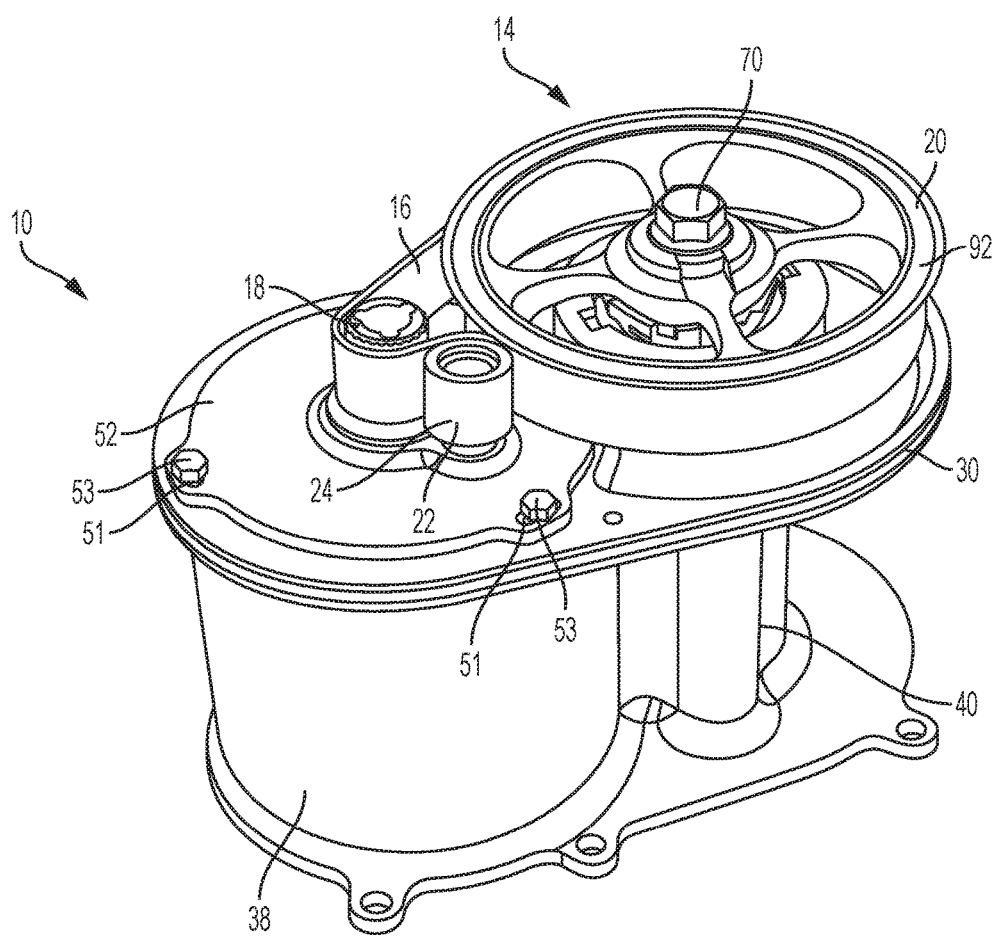
FIG. 1 is a perspective view of an embodiment of a power assist system having a pulley assembly.

Referring now to the Figures, where embodiments will be described, without limiting same, a power assist system 10 is shown in FIG. 1 with a cover 12 (shown in FIGS. 2 and 3) removed to expose a pulley assembly 14. The pulley assembly 14 includes the belt 16, a drive pulley 18, a driven pulley 20, and an idler 22. The idler 22 maintains the tension of the belt 16 and includes an idler pulley 24, and a bearing 26 supported on an idler shaft 28. The pulleys 18, 20, 24 are arranged with respect to a housing 30 for a motor 32 and a ball screw assembly 34, such as one including a ball nut, ball screw, and balls, as will be further described below.

Figure 2:
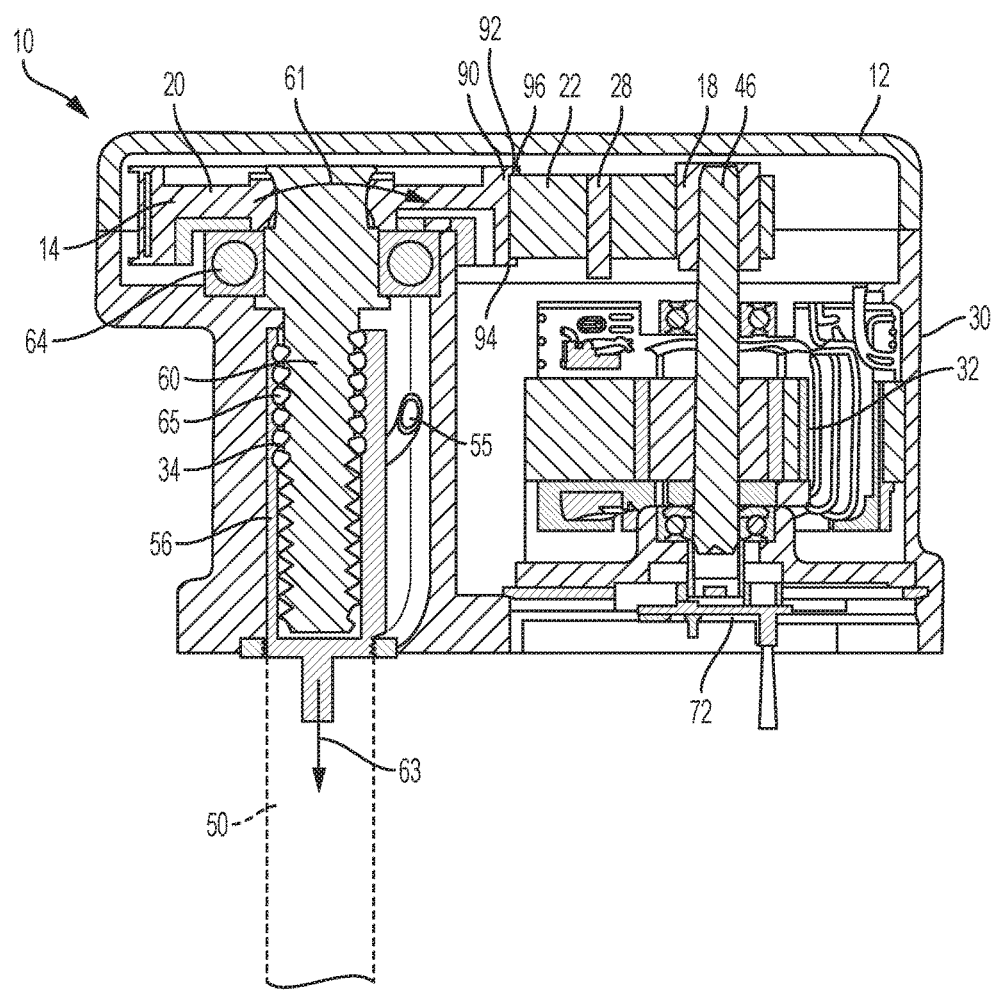
FIG. 2 is a cross-sectional view of an embodiment of a power assist system.
Figure 3:
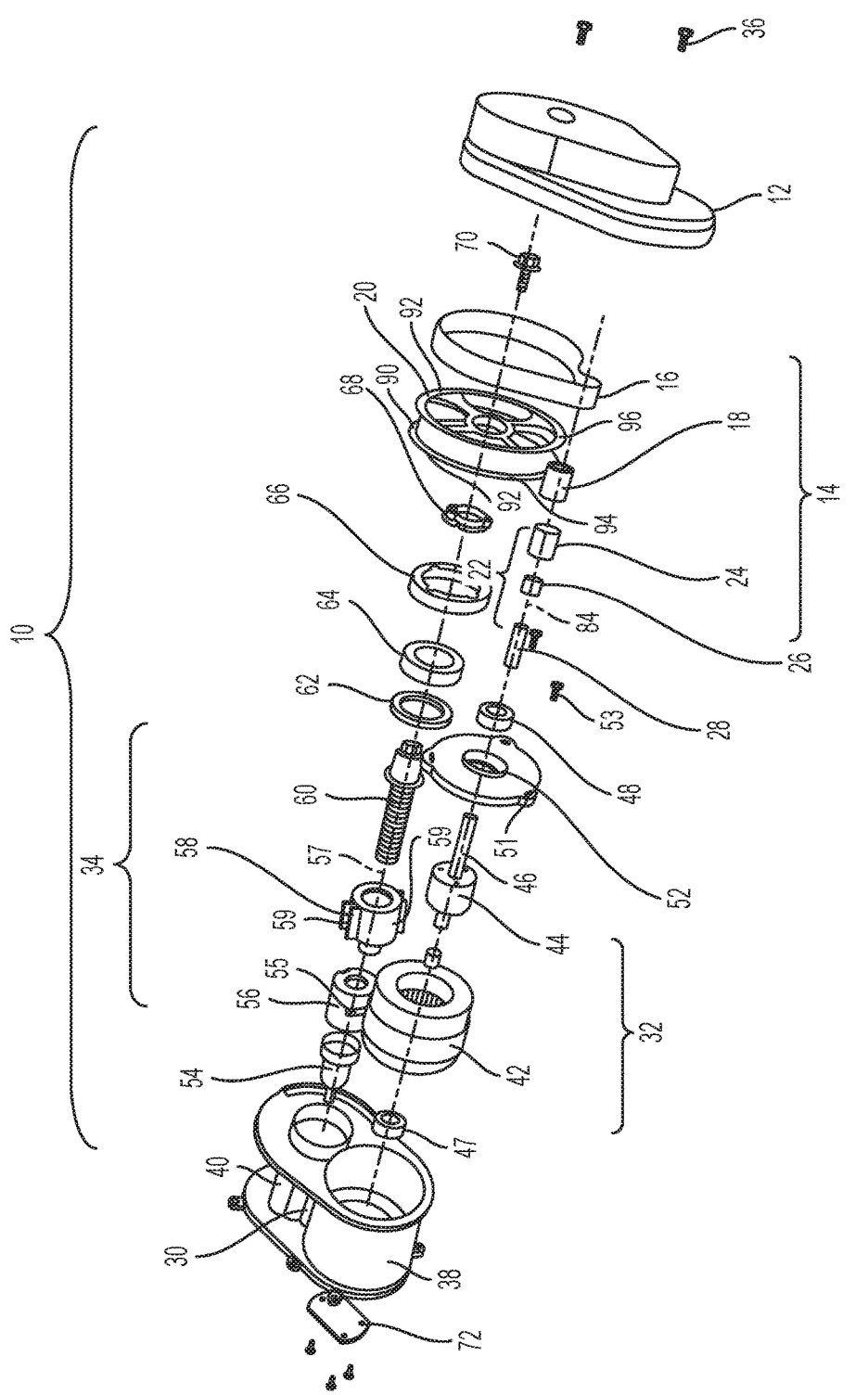
FIG. 3 is an exploded view of an embodiment of the power assist system.

With further reference to FIGS. 2 and 3, an embodiment of components housed within the housing 30 is illustrated. The cover 12 may be secured to the housing 30 using a securement device 36, such as screws or the like. The cover 12 enables easy access to the belt 16 and pulleys 18, 20, 24 during the tensioning operation during assembly. The housing 30 includes a drive section 38 and a driven section 40. At least one motor 32 is disposed in the drive section 38. The motor 32 may be an electric motor, and may include a motor stator 42 and a motor rotor 44, the rotor shaft 46 positioned by bearings 47, 48. In one embodiment, the motor 32 may be a direct current permanent magnet motor, and a motor rotation sensor 72 is secured thereto. As shown, the rotor shaft 46 may be positioned substantially axially parallel to a driven shaft 50 (attached to the ball screw assembly 34), however the orientation of the driven shaft 50 with respect to the rotor shaft 46 may be altered. A motor plate 52 covers at least the drive section 38 of the housing 30. The rotor shaft 46 may protrude outwardly from the housing 30 through the motor plate 52 and the drive pulley 18 may be secured to the rotor shaft 46 exteriorly of the housing 30, but interiorly of the cover 12. Attached to the motor plate 52, or passing therethrough, is the idler shaft 28 for supporting the idler pulley 24 thereon. The idler pulley 24 is secured to the idler shaft 28 through the use of a needle bearing 26, as will be further described below.

Within the driven section 40, the ball screw assembly 34 is housed. The ball screw assembly 34 may either transmit rotation of the driven pulley 20 to rotation of a driven shaft 50, or alternatively may convert rotation of the driven pulley 20 to linear motion of the driven shaft 50. In the illustrated embodiment, a rotation-to-linear motion ball screw assembly 34 is illustrated. The ball screw assembly 34 translates rotational motion to linear motion with little friction by incorporating a helical raceway 65 for ball bearings between the ball screw 60 and the ball nut 56. A ball return system 55 is also included in the ball screw assembly 34. The circulating balls travel within the helical raceway 65, and the ball return system 55 prevents the balls from falling out of the end of the ball screw assembly 34 when they reach the end of the raceway 65.

A linearly translated plunger 54 is attached to or integral with the ball nut 56 for axially moving the driven shaft 50. As illustrated, the plunger 54 extends along the longitudinal axis of the ball screw 60, however other connections between the ball nut 56 and the driven shaft 50 may be accommodated. The ball nut 56 may be prevented from rotating by an anti-rotation device 58, such as an anti-rotation sleeve 58 having radially extending vanes 59 that extend longitudinally parallel with a longitudinal axis 57 of the ball screw assembly 34 and that may be secured within slots in the housing 30 such that the anti-rotation device 58, and the connected ball nut 56, are not rotatable within the housing 30. The longitudinally extending vanes 59 do not prohibit longitudinal movement of the ball nut 56 within the housing 30, and instead are longitudinally slidable within the housing. While fixed rotationally with respect to the housing 30, the ball nut 56 is movable longitudinally with respect to the housing 30. The vanes 59 may extend substantially a length of the anti-rotation sleeve 58 as shown, however alternate embodiments of an anti-rotation device 58 may be provided for prohibiting the ball nut 56 from rotating within the housing 30. The housing 30 is operatively engaged with the ball nut 56 to prevent the ball nut 56 from rotating with respect to the housing 30. The ball screw 60 is positioned within the ball nut 56 for rotation therein. The ball screw 60 is connected to the driven pulley 20 such that rotation of the driven pulley 20 correspondingly rotates the ball screw 60. Interposed between the ball screw 60 and the driven pulley 20 may be a stop 62, bearing 64, outer race threaded retainer 66, and inner race threaded retainer 68, which are secured relative to the ball screw 60 and driven pulley 20 through the use of a securement device 70, such as a bolt. Alternatively, other mechanical interconnections may be used to transfer rotation from the driven pulley 20 to the ball screw assembly 34. The ball screw 60 is supported by the bearing 64 in the housing 30. The ball screw 60 may be fixed longitudinally within the housing 30, such as by the bearing 64, but yet rotatable within and with respect to the housing 30. The ball screw 60 thus rotates and transmits power from the driven pulley 20 to the ball nut 56. In one embodiment, when the ball screw 60 rotates in rotational direction 61, the ball nut 56 correspondingly moves in longitudinal direction 63 to correspondingly move a driven shaft 50 in a longitudinal direction.

Advantages are appreciated by embodiments of the linearly translated ball nut 56 of the embodiments of the ball screw assembly 34. Since the ball screw 60 is rotating instead of the larger diametered ball nut 56, the power assist system 10 is provided with lower inertia. There is less noise in the system 10 because the ball nut 56 is not rotating which means that the ball return 56 moves at a much slower velocity. The linear translated ball nut 56 is less complex than a rotatable ball nut. Also, due to the arrangement of the ball screw assembly 34, the pulley system 14 can be positioned on a back side of the housing 30 (opposite a front side of the housing 30 where the motor rotation sensor 72 is provided and the driven shaft 50 is attached), which reduces packaging of the power assist system 10.

Figure 4:
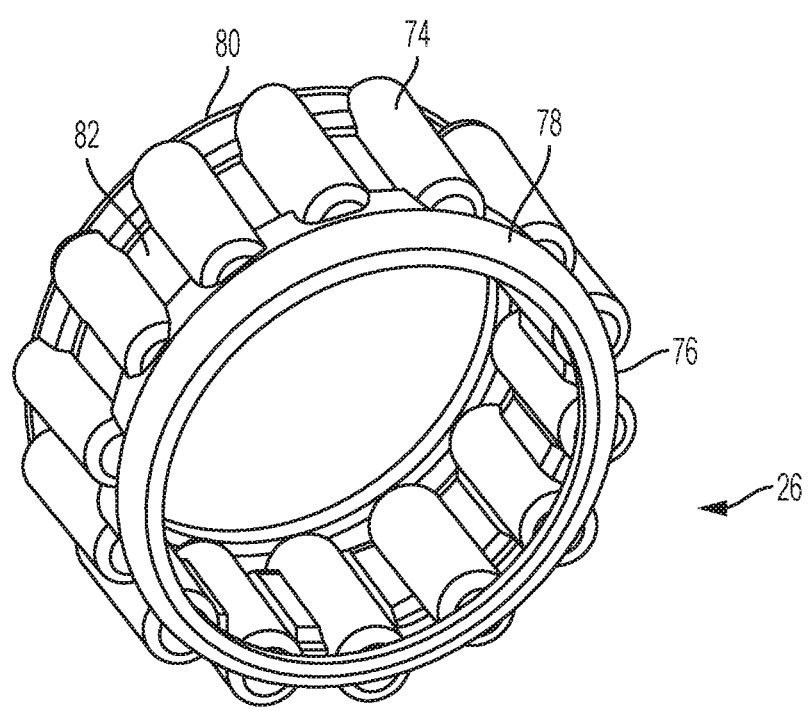
FIG. 4 is a perspective view of an embodiment of a needle bearing for use in the pulley assembly of the power assist system.

The ball bearing 4 (see FIG. 11) is conventionally utilized within an idler pulley 3 to prevent end faces of the idler 1 from rubbing against a housing. The embodiments of an idler 22 described herein, however, incorporate a needle bearing 26 for cost effectiveness and ease of manufacture. One embodiment of a needle bearing 26 is further shown in FIG. 4, however other types of needle bearings may be incorporated. The illustrated needle bearing 26 includes a plurality of needle rollers 74 and a cage 76. The cage 76 may include end rings 78, 80 that are connected by a plurality of cross bars 82 to form a plurality of roller-receiving windows. Because the needle rollers 74 do not have any sort of radially outward projection that could prevent the idler 22 from moving in the direction of the longitudinal axis 84 of the idler 22, the utilization of a needle bearing 26 instead of ball bearing 4 introduces the problem of potentially allowing the end faces 86, 88 (see FIG. 5) of the idler 22 to rub against the housing 30 or cover 12 causing sliding noise and friction. To eliminate this problem, embodiments of the pulley assembly 14 include an axial trap 90 that restricts longitudinal movement of the idler 22 along the longitudinal axis 84. The axial trap 90 may be provided on at least one pulley —either one or more of the idler pulley 24, drive pulley 18, and driven pulley 20. More particularly, the axial trap 90 may include flanges 92 that cooperate with adjacent pulleys to prevent the idler 22 from rubbing against the housing 30

(including motor plate 52) and cover 12. If the flanges 92 are on at least one of the drive pulley 18 or driven pulley 20, the flanges 92 at least partially overlap the idler pulley 24. Because the drive pulley 18 and the driven pulley 20 are fixed in relative longitudinal locations, trapping the idler pulley 24 with respect to a longitudinal location of the drive pulley 18 and driven pulley 20 prevents the idler 22 from moving in a longitudinal direction towards either of the housing 30 or cover 12.

As more clearly shown in FIGS. 2 and 3, one embodiment of the pulley assembly 14 includes the driven pulley 20 having two flanges 92, a first flange 94 that extends partially over (partially overlaps) the first end face 86 of the idler 22 and a second flange 96 that extends partially over (partially overlaps) the second end face 88 of the idler 22. The first end face 86 of the idler 22 faces the motor plate 52, and the second end face 88 of the idler 22 faces the cover 12. Thus, the first flange 94 is disposed between the idler 22 and the motor plate 52, and the second flange 96 is disposed between the idler 22 and the cover 12.

Figure 5:
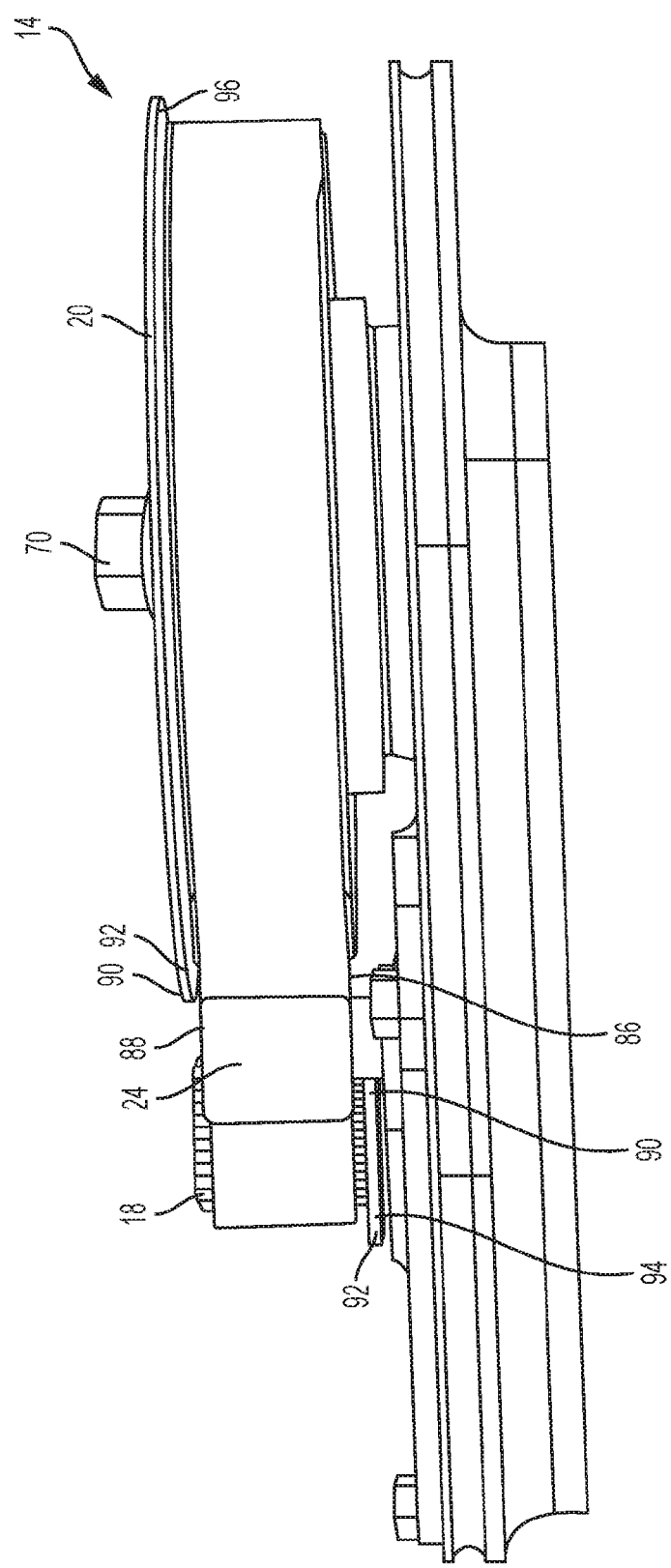
FIG. 5 is a side view of an embodiment of the pulley assembly arranged with the power assist system.
Figure 6:
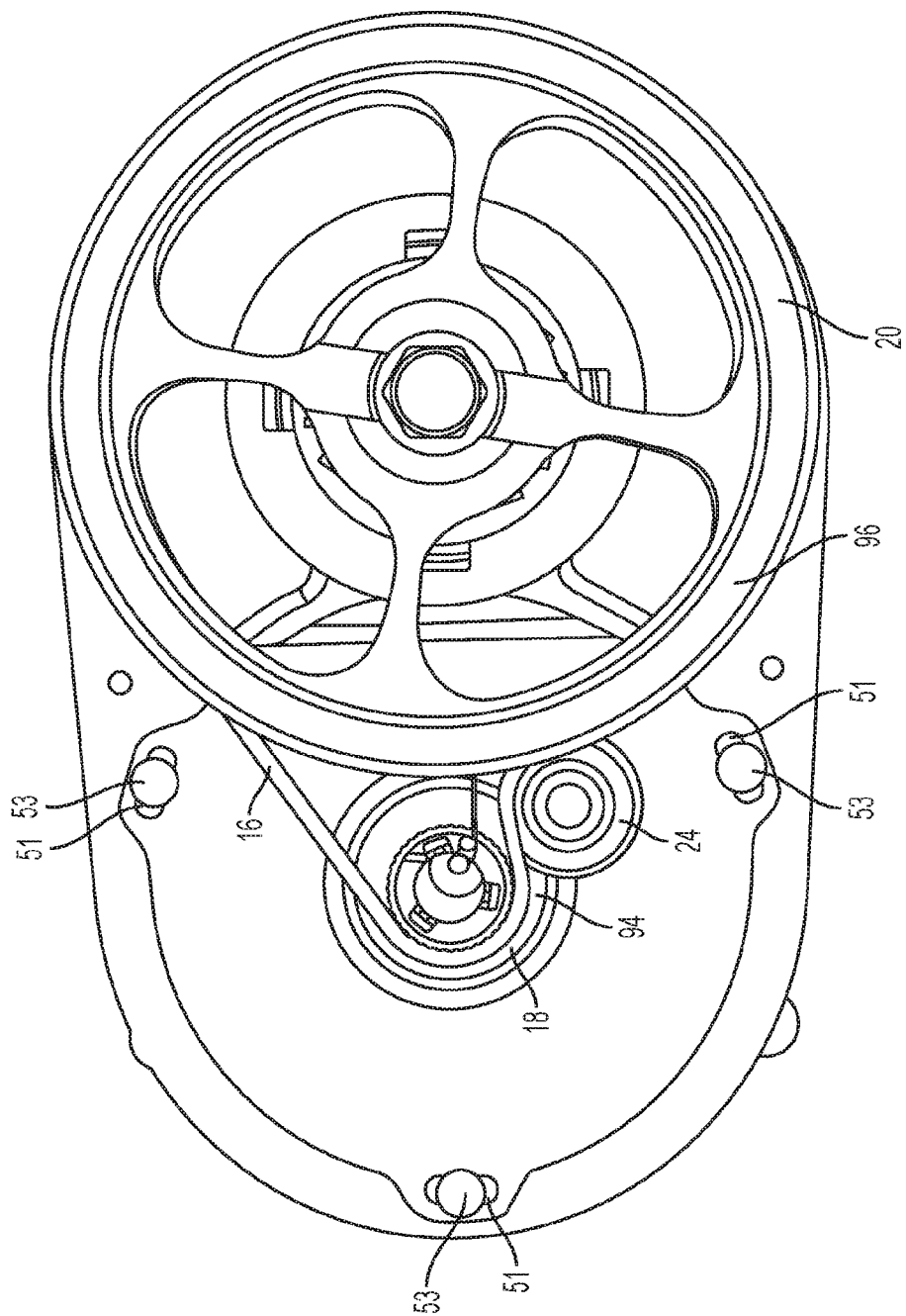
FIG. 6 is a top view of an embodiment of the pulley assembly arranged with the power assist system.

FIGS. 5 and 6 show another embodiment of the pulley assembly 14 where the drive pulley 18 includes the first flange 94, partially interposed between the idler 22 and the motor plate 52, and the driven pulley 20 includes the second flange 96, partially interposed between the idler 22 and the cover 12. In this embodiment, the axis for the drive pulley 18 and the axis for the driven pulley 20 must be close enough together to ensure overlap with the idler 22. Thus, even with the use of the needle bearing 26 in the idler 22, the idler 22 is prevented from rubbing against the housing 30 (including motor plate 52) and cover 12 during use.

Other embodiments of preventing end faces 86, 88 of the idler 22 from rubbing against the housing 30 and cover 12 are shown in FIGS. 7 to 10. FIG. 7 shows an embodiment with one flange 92 on the drive pulley 18 and one flange 92 on the driven pulley 20, FIG. 8 shows an embodiment with two flanges 92 on the drive pulley 18, FIG. 9 shows an embodiment with two flanges 92 on the driven pulley 20, and FIG. 10 shows an embodiment with two flanges 92 on the idler pulley 24. Although not illustrated, other embodiments of preventing the idler 22 from rubbing against the housing 30 and cover 12 could include providing one flange 92 on the idler pulley 24 and one flange 92 on the drive pulley 18, or one flange 92 on the idler pulley 24 and one flange on the driven pulley 20. Embodiments could even include three or more flanges 92, such as providing first and second flanges on both the drive pulley 18 and the driven pulley 20, or two flanges 92 on the drive pulley 18 and one flange 92 on the driven pulley 20, or one flange 92 on the idler pulley 24 and one flange 92 on each of the drive pulley 18 and driven pulley 20, etc. Thus, as long as the idler 22 is limited in longitudinal movement towards the housing 30 and cover 12 by at least first and second flanges 94, 96 extending from one or more of the idler pulley 24, drive pulley 18, and driven pulley 20, the idler 22 will not drift towards and rub against the housing 30 and cover 12, thus reducing the risk of sliding noise and friction. It is further noted that the linear surface speed of the pulleys 18, 20, 24 is the same; so sliding is eliminated, or at least substantially eliminated.

Figure 11:
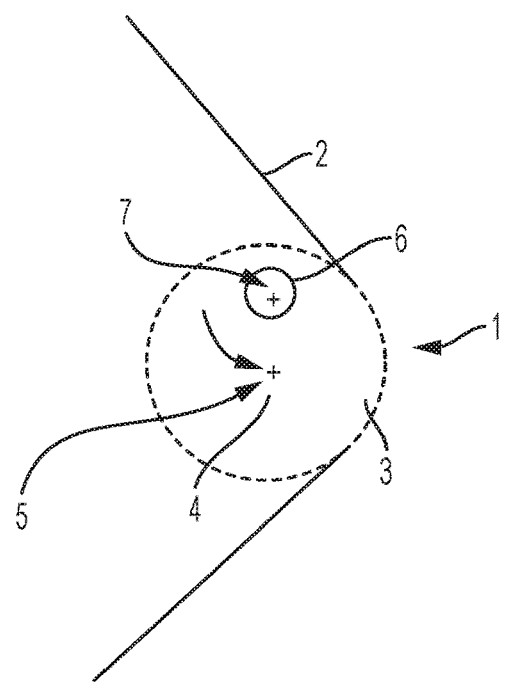
FIG. 11 is a schematic view of an idler and belt according to the prior art.

FIG. 11 shows a conventional idler 1 in relation to a belt 2 to be tensioned. The idler 1 includes an idler pulley 3, a ball bearing 4 (details not shown) with a ball bearing axis 5, a screw 6 with a screw axis 7, and an eccentric cam (radially interior of the idler pulley 3). In such an arrangement, both the eccentric cam and the idler pulley 3 must be custom machined, which adds to the cost of the idler 1. The screw 6 is both a pivot point for the eccentricity and a clamp. Rotation of the eccentric cam about the screw axis 7 causes the bearing axis 5 to move closer to the belt 2. The belt 2 is contacted by the idler pulley 3, which is pressed onto the bearing 4. Thus, eccentric rotation of the idler 1 on the eccentric cam tensions the belt 2. The ball bearing 4 is used to prevent end faces of the idler pulley 3 from rubbing against a housing.

Figure 12:
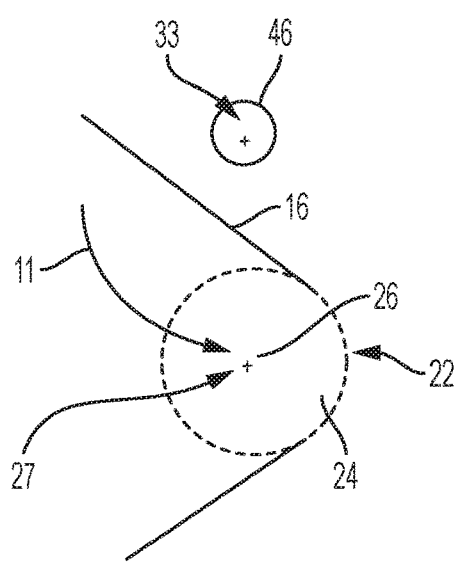
FIG. 12 is a schematic view of an embodiment of an idler and belt for a pulley assembly.
Figure 13:
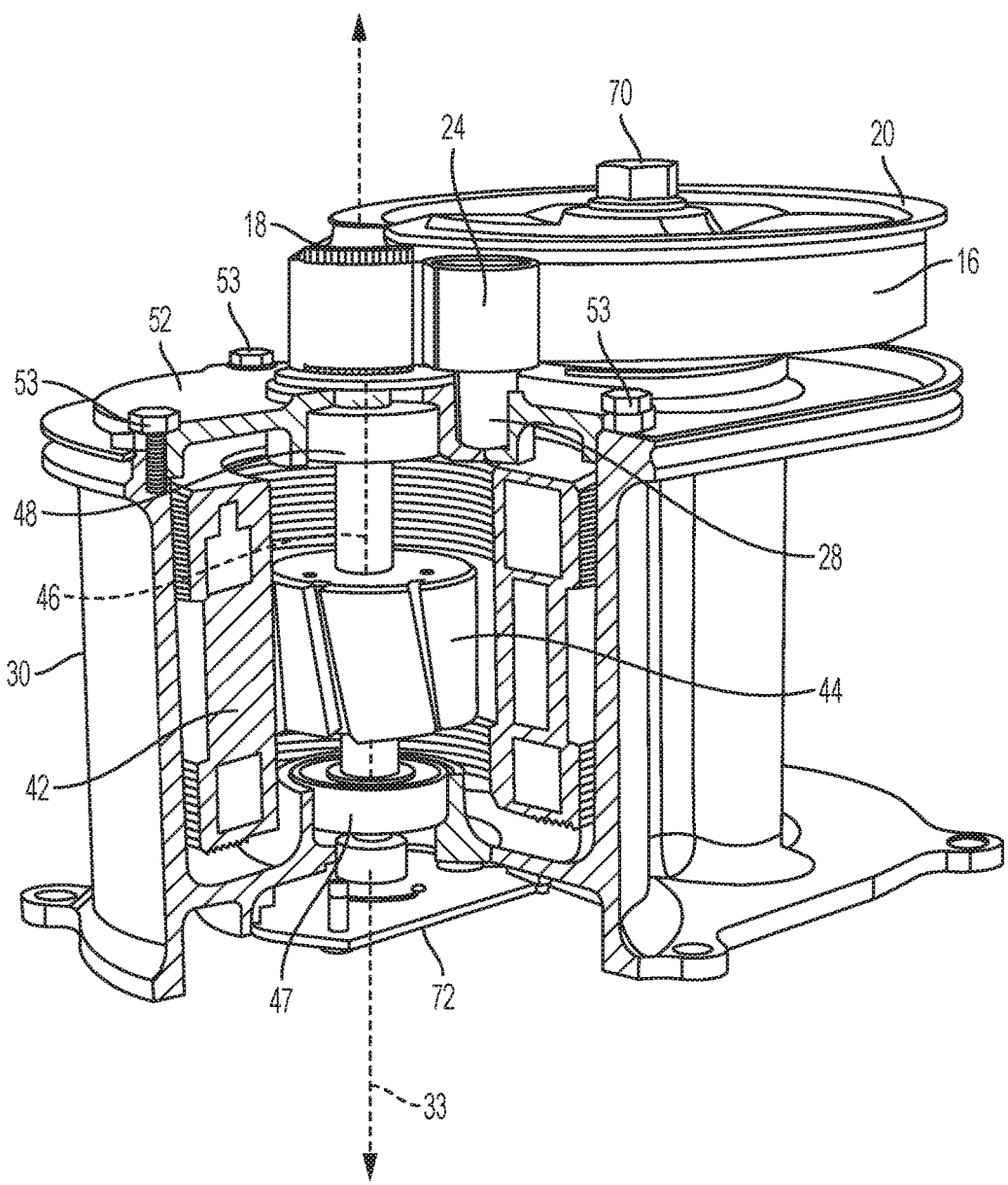
FIG. 13 is a perspective and partial cut-away view of the power assist system.

FIG. 12 shows an embodiment of the idler 22. The idler 22 is arranged to tension the belt 16 using the idler pulley 24. Unlike the prior art, the idler 22 partially rotates about a motor axis 33 of the motor rotor shaft 46, as indicated by arrow 11 to provide the eccentricity needed for tensioning the belt 16. This is accomplished using the idler shaft 28 affixed within the motor plate 52 as described with respect to FIGS. 1, 3, and 13. The idler 22 further includes the needle bearing 26 having a needle bearing axis 27. The needle bearing 26 provides cost benefits as compared to the ball bearing, 4, and its inclusion within the idler 22 is made possible using the axial trap 90. Rotation of the motor plate 52 about the motor axis 33 causes the bearing axis 27 to move closer to the belt 16. The belt 16 is contacted by the idler pulley 24, which is snap fit onto the bearing 26.

With further reference to FIGS. 1, 3, 6, and 13, movement of the tensioning function of the idler 22 will be further described. The motor plate 52 is secured to the housing 30 using a plurality of securement devices 53, such as screws. The motor plate 52 is selectably securable to the housing 30 at a position corresponding to a desired tension of the belt 16. That is, the position of the motor plate 52 with respect to the housing 30 is adjustable to correspondingly adjust a position of the idler 22. The illustrated embodiment includes three securement devices 53, however an alternate number of securement devices 53 may be employed. The motor plate 52 further includes a corresponding number of securement device receiving slots 51 for receiving the securement devices 53 there through and for additionally allowing a preset distance of rotational movement of the motor plate 52 with respect to the motor axis 33. The slots 51 may have an arcuate shape and a length. As illustrated, each of the securement devices 53 include a shank portion that extends through the slots 51 and into a respective receiving aperture in the housing 30, and a head portion that overlaps at least a portion of the motor plate 52 for trapping the motor plate 52 onto the housing 30. The shank portion includes threads threadably mated with threads in the receiving aperture in the housing 30 so that the securement devices 53 can be threaded within the receiving apertures. However, the securement devices 53 may be unthreaded partially from the receiving apertures to allow rotational movement of the motor plate 52 with respect to the housing 30. The rotational movement of the motor plate 52 is limited by the length of the receiving slots 51, as the ends of the receiving slots 51 abut with the shank of the securement devices 53 if rotation of the plate 52 is attempted past the shank. Since the motor plate 52 carries the idler shaft 28 (FIG. 13), the idler 22 may rotate (move/translate) no more than the length of the slot 51 when the motor plate 52 is rotated about the motor axis 33. Once a desired position of the idler shaft 28 is selected, the securement devices 53 can secure the motor plate 52 to the housing 30 at any location within the slots 51 for adjusting the contact pressure of the idler 22 on the belt 16, thus adjusting the tensioning of the belt 16 as necessary. The bearing 48 is concentric with the rotor shaft 46, and concentrically located within the motor plate 52, so the motor axis 33 is not shifted during rotation of the motor plate 52, thus simplifying the tensioning adjustment of the idler 22.

The pulley assembly 14 does not require the machined custom eccentric cam of the prior art, thus eliminating a part. Also, needle bearing 26 is less expensive than ball bearing 4. The idler 22 further does not require the separate screw 6 to secure the idler pulley 24 into the tensioned location along the belt 16, thus eliminating an additional part. Thus, the pulley assembly 14 and power assist system 10 provides a more cost effective solution as compared to the prior art shown in FIG. 11.

Figure 14:
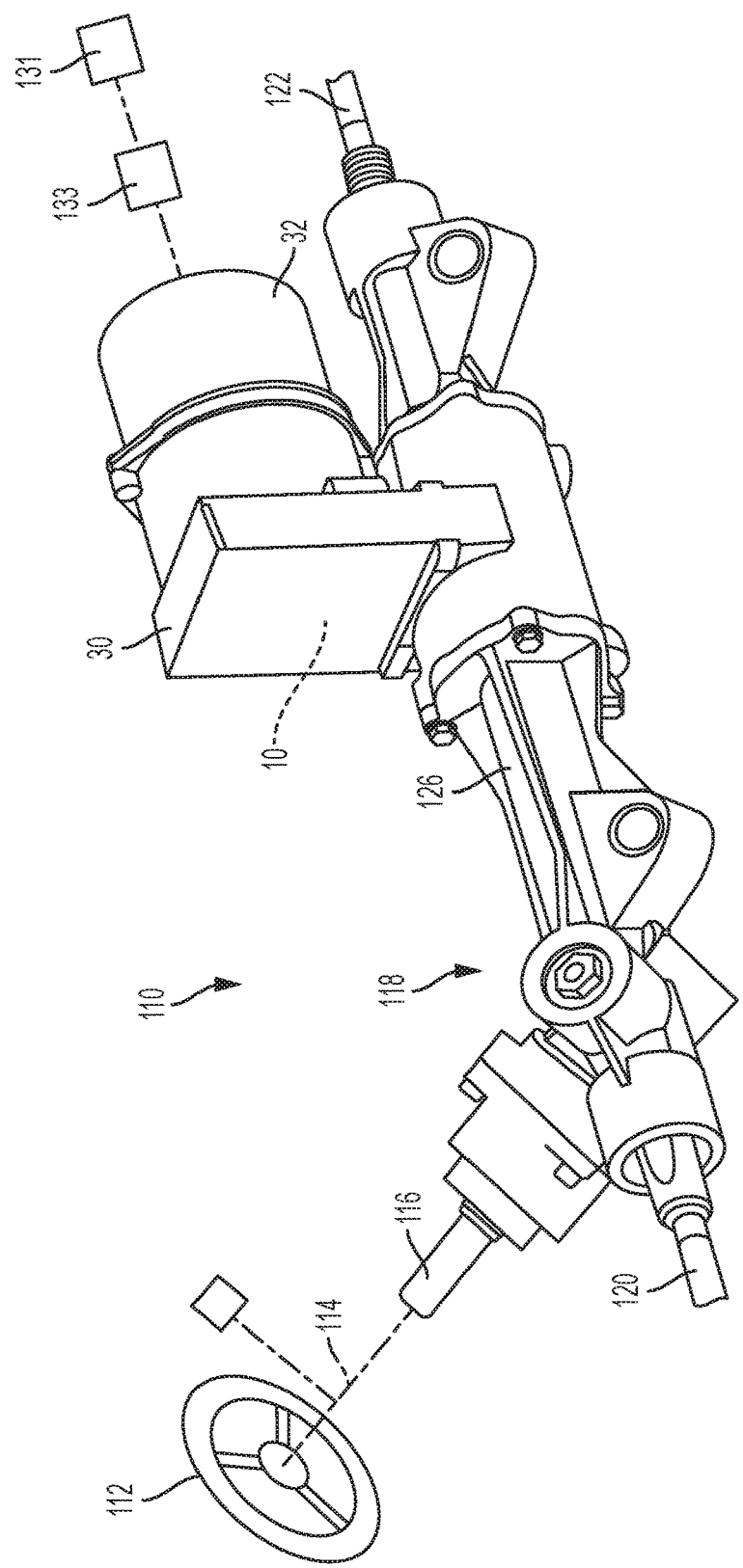
FIG. 14 is a perspective view of an electric power steering system incorporating the power assist system; and, FIG. 15 is a sectional and schematic view of a brake boost actuator incorporating the power assist system.

The above-described power assist system 10 having the pulley assembly 14 with longitudinally trapped idler 22 may be incorporated into a number of different applications, such as, but not limited to, vehicular applications including an electric power steering system and an electric brake boost system. In one embodiment, such as shown in FIG. 14, the power assist system 10 may be utilized within a steering system 110, such as an electric power steering system. The system 110 includes a steering wheel 112 operated by the driver of a vehicle. The steering wheel 112 is connected to an end of a steering column, indicated schematically at 114. Rotation of the steering wheel 112 rotates the steering column 114. The other end of the steering column 114 is connected to an input shaft 116 of a steering gear assembly, indicated generally at 118. The steering gear assembly 118 transfers rotational movement of the input shaft 116 into linear movement of tie rods 120 and 122 extending from ends of the steering gear assembly 118. The tie rods 120 and 122 are connected to vehicle wheels (not shown) such that linear movement of the tie rods 120 and 122 causes steering rotation of the wheels.

The steering gear assembly 118 can be any suitable mechanism for converting the rotational movement of the input shaft 116 into linear movement of the tie rods 120 and 122. The tie rods 120 and 122 are connected to a steering member (not shown), which translates within a bore formed in a housing 126 of the steering gear assembly 118. The steering member includes a rack portion (not shown) having a series of rack teeth formed therein, which meshingly engage with a pinion gear (not shown) coupled to the input shaft 116. Rotation of the pinion gear moves the rack portion of the steering member in a linear direction. Movement of the steering member causes linear movement of the tie rods 120, 122, thereby turning the wheels.

The assembly 10 further includes a drive unit, such as an electrical motor 32. The drive unit effects axial movement of the steering member to provide an assisting force in addition to the manual force input from the driver via the steering wheel 112, the steering column 114, and the steering gear assembly 118. In the event of the inability of the electric motor 32 to effect axial movement of the steering member, the mechanical connection between the input member 116 and the steering member permits manual steering of the vehicle. The motor 32 is connected to an electrical power source 131 via a controller 133. The power source 131 can be any suitable power source such as the vehicle's battery or the electrical charging system. The motor 32 is actuated and controlled by the controller 133 for providing the desired rotational speed and rotational direction of the rotor shaft 46 of the motor 32. The controller 133 can be any suitable mechanism, such as a microprocessor, which can vary the speed of the motor 32 as well as the rotational direction of the motor 32 corresponding to the steering direction of the wheels. The housing 30 (and cover 12) may enclose the previously described pulley assembly 14, where the motor 30 includes an output shaft 46 rotatably coupled to the drive pulley 18 of the pulley assembly 14. The driven pulley 20 of the pulley assembly 14 is rotationally engaged with the ball screw assembly 34 which may be rotationally engaged with the screw portion of the steering member previously described. The steering gear assembly 118 may also be arranged such that linear actuation of the ball nut 56 is utilized to assist in linear movement of the tie rods 120, 122.

Drive and driven pulleys 18, 20 are rotatably connected to each other via the flexible belt 16. Each of the pulleys 18, 20 has an outer surface that engages an inner face of the belt 16. The surfaces of the pulleys 18, 20 and the inner face of the belt 16 can have any suitable contour or texture to help ensure a gripping contact between the belt 16 and the pulleys 18, 20. For example, the surfaces of the pulleys 18, 20 and the inner face of the belt 16 can include toothed mating notches formed therein.

The belt 16 is fit relatively snugly about the outer circumferences of the pulleys 18, 20. Thus, rotational movement of the drive pulley 18 causes rotation of the driven pulley 20. The diameters of the pulleys 18 and 20 can be any suitable dimension for providing any desired "gear ratio", such that the rotational speed of the drive pulley 18 is different from the rotational speed of the driven pulley 20. The looping of the belt 16 about the drive pulley 18 and the driven pulley 20 define two unsupported belt sides or portions, which are not in contact with the pulleys 18 and 20, extending between the pulleys 18 and 20.

The belt 16 may be made from any suitable material or combination of materials flexible enough to loop around pulleys 18 and 20 and maintain engagement with the outer surfaces of the pulleys 18 and 20 during rotation thereof The belt may be a vee belt or a cog belt, or the belt may be made of individual links forming a chain. The belt 16 may be made of an elastomeric material, and may include internal metallic reinforcing members.

The above-described idler pulley 24 engages with at least one of the unsupported slack-side portions of the belt 16. The idler 22 may be secured through rotation of the motor plate 52 and secured using the securement devices 53 at the selected proper tension of the belt 16 to engage with one slack-side portion of the belt 16. Alternatively, two idlers 22 may be provided to engage with two side portions of the belt 16 (such as one inside the belt 16 and one outside the belt 16). The particular arrangement of the idler 22 with respect to the belt 16 may be varied. The idler 22 is also trapped longitudinally with respect to the drive and driven pulleys 18, 20, by the axial trap 90 as previously described.

Figure 15:
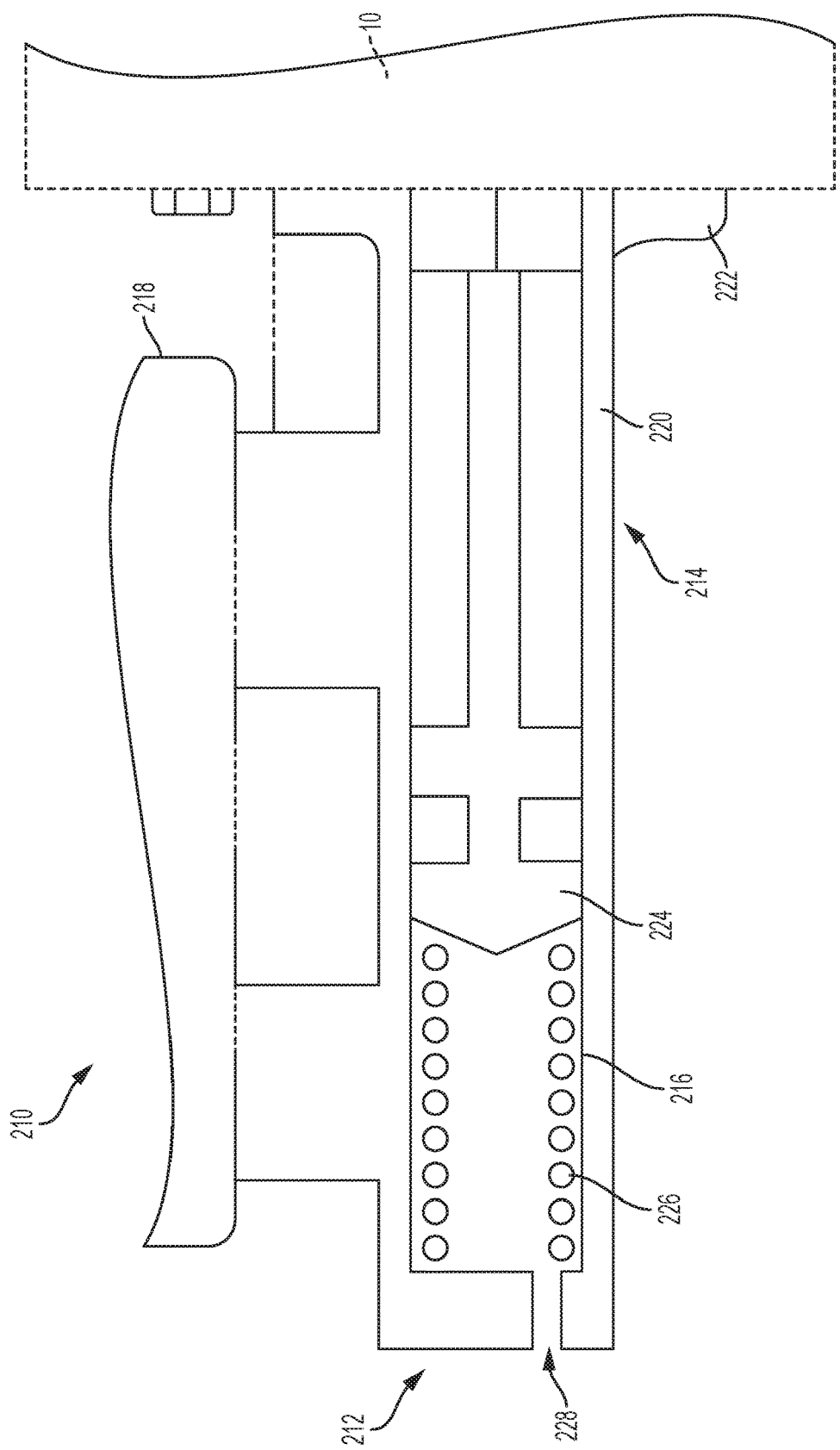

In an embodiment where the above-described power assist system 10 having the pulley assembly 14 with longitudinally trapped idler 22 is incorporated into an electric brake boost system 210 (FIG. 15), the housing 30 may enclose portions of the motor 32, as well as the pulley assembly 14 for transferring rotation of the rotor shaft 46 to a driven pulley 20, which in turn moves a portion of a brake boost actuator 212. For example, with reference to FIG. 15, the brake boost actuator 212 may include a master cylinder 214 interconnected to the motor 32 of the power assist system 10 by a ball screw assembly 34. The master cylinder 214 may include the previously described ball nut 56 (and/or the ball screw 60), which is drivable by the driven pulley 20. The ball screw assembly 34 generally provides linear input of driver apply force to the master cylinder 214 and boost system 210. The system 210 allows brake input force to be applied to the master cylinder 214 from linear motion of the ball screw assembly 34. The master cylinder 214 includes a bore 216 and a reservoir 218 (partially shown) that can be attached to housing 30. Master cylinder 214 can generally include a main body member 220, reservoir 218, a mounting flange 222, a piston 224, and a return spring 226. The spring 226 can provide a return bias to the piston 224. Main body member 220 and flange 222 can be formed as a single integral member. The flange 222 allows attachment of the master cylinder 214 to the housing 30. The main body member 220 may be a generally cylindrical member, and may define the elongated axial bore 216 or chamber into which the piston 224 is slidably disposed. The reservoir 218 stores and provides brake fluid. The bore 216 of the body member 220 is in fluid communication with the reservoir 218. Movement (inward advancement) of the piston 224 within the bore 216 provides brake fluid apply pressure to an associated remote brake assembly through outlet 228. An output end of the ball screw assembly 34 can transfer the force provided by either (or both) the vehicle operator depressing a brake pedal and operation of the motor 32 and ball screw assembly 34 to the piston 224. In this manner, the driver apply force and the boost force are additive. In particular, when the ball screw assembly 34 includes the linearly actuated ball nut 56, movement of the ball nut 56 can be coupled to the piston 224 for linear movement of the piston 224 within the bore 216.

While two embodiments for employing the pulley assembly 14 have been described within vehicular power assist systems 10, the pulley assembly 14 may also be utilized in other applications not herein described.

Set forth below are some embodiments of the foregoing disclosure:

A power assist system including: a motor having a rotor shaft; a drive pulley attached to the rotor shaft; a driven pulley; a flexible belt configured to connect the drive pulley to the driven pulley; and, a ball screw assembly including: a rotatable ball screw rotatable with the driven pulley; a linearly translated ball nut surrounding the ball screw; and, an anti-rotation device arranged to prevent rotation of the ball nut.

The power assist system of any of the preceding embodiments, further including a driven shaft attached to the ball nut, wherein the driven shaft is linearly translated by the ball nut exteriorly of the power assist system.

The power assist system of any of the preceding embodiments, further including a plunger attached to the ball nut, the plunger extending along a longitudinal axis of the ball screw and configured for attachment to the driven shaft.

The power assist system of any of the preceding embodiments, further including a housing, the housing including a drive section and a driven section, the motor disposed in the drive section, and the ball screw assembly disposed in the driven section.

The power assist system of any of the preceding embodiments, further including a bearing supporting the ball screw to the housing, the bearing at least substantially prohibiting longitudinal movement of the ball screw with respect to the housing.

The power assist system of any of the preceding embodiments, wherein the drive pulley, the driven pulley, and the belt are disposed exteriorly of the housing.

The power assist system of any of the preceding embodiments, further including a cover, wherein the drive pulley, the driven pulley, and the belt are disposed between the cover and the housing.

The power assist system of any of the preceding embodiments, further including an idler including an idler pulley engaged with the belt, and a needle bearing.

The power assist system of any of the preceding embodiments, wherein the idler further includes an idler shaft having a shaft axis, the needle bearing secured to the idler shaft, the pulley assembly further including an axial trap configured to restrict longitudinal movement of the idler along the shaft axis.

The power assist system of any of the preceding embodiments, wherein the pulley assembly is disposed between the housing and a cover, the axial trap configured to block contact of the idler with the housing and the cover.

The power assist system of any of the preceding embodiments, wherein the axial trap includes at least two flanges, the at least two flanges extending from at least one of the drive pulley, driven pulley, and idler pulley.

The power assist system of any of the preceding embodiments, further including a plate at least partially rotatable with respect to a longitudinal axis of the rotor shaft, and an idler, the idler including an idler pulley and an idler shaft, the idler pulley engageable with the belt, and the idler shaft fixedly arranged with respect to the plate, wherein tensioning of the belt is adjusted by rotating the idler shaft and the plate about the longitudinal axis.

The power assist system of any of the preceding embodiments, further including a housing, the motor received in the housing, wherein the plate is securable to the housing in more than one rotational position with respect to the housing and the rotor axis.

The power assist system of any of the preceding embodiments, wherein the idler further includes a needle bearing secured to the idler shaft, the idler pulley rotatable about the needle bearing.

The power assist system of any of the preceding embodiments, wherein the anti-rotation device includes at least one longitudinally extending vane slidable longitudinally within the housing.

An electric power steering system including the power assist system of any of the preceding embodiments; and a steering gear assembly, wherein rotation of the driven pulley by the drive pulley operates a driven shaft operatively engaged with the steering gear assembly.

A brake boost actuator including a power assist system of any of the preceding embodiments and, a master cylinder including a reservoir and a piston, rotation of the ball screw by the driven pulley being converted to linear motion of the piston through the ball nut.

The brake boost actuator of any of the preceding embodiments, further including an idler including an idler pulley and a needle bearing, the idler pulley engaged with the belt.

The brake boost actuator of any of the preceding embodiments, further including a plate at least partially rotatable with respect to a longitudinal axis of the rotor shaft, and an idler, the idler including an idler pulley and an idler shaft, the idler pulley engageable with the belt, and the idler shaft fixedly arranged with respect to the plate, wherein tensioning of the belt is adjusted by rotating the idler shaft and the plate about the longitudinal axis.

A method of linearly translating a driven shaft by a power assist system, the method including arranging a pulley assembly between a housing and cover of the power assist system, the pulley assembly including a drive pulley rotatable about a first longitudinal axis, a driven pulley, a flexible belt configured to connect the drive pulley to the driven pulley; connecting the driven pulley to a ball screw for rotating the ball screw with the driven pulley; assembling a ball nut with an anti-rotation device on the ball screw; and, attaching the driven shaft to the ball nut.

The method of any of the preceding embodiments, wherein arranging the pulley assembly further comprises providing a plate at least partially rotatable with respect to the first longitudinal axis, and an idler including an idler pulley and an idler shaft, the idler pulley engageable with the belt, and the idler shaft fixedly arranged with respect to the plate; the method further comprising adjusting tension of the belt by rotating the idler and the plate about the first longitudinal axis.

The method of any of the preceding embodiments, wherein the idler further includes a needle bearing secured to the idler shaft, the idler pulley rotatable about the needle bearing.

The method of any of the preceding embodiments, wherein the driven shaft is a piston for a brake boost actuator.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A power assist system comprising:
    a motor having a rotor shaft;
    a drive pulley attached to the rotor shaft;
    a driven pulley;
    a flexible belt configured to connect the drive pulley to the driven pulley; and,
    a ball screw assembly including:
        a rotatable ball screw rotatable with the driven pulley;
        a linearly translated ball nut surrounding the ball screw;
        a plunger attached to or integral with the ball nut, the plunger extending along a longitudinal axis of the ball screw and configured for attachment to a driven shaft to axially move the driven shaft; and,
        an anti-rotation device arranged to prevent rotation of the ball nut.

2. The power assist system of claim 1, further comprising the driven shaft attached to the ball nut, wherein the driven shaft is linearly translated by the ball nut exteriorly of the power assist system.

3. The power assist system of claim 1, wherein rotation of the driven pulley rotates the ball screw.

4. The power assist system of claim 1, further comprising a housing, the housing including a drive section and a driven section, the motor disposed in the drive section, and the ball screw assembly disposed in the driven section.

5. The power assist system of claim 4, further comprising a bearing supporting the ball screw to the housing, the bearing at least substantially prohibiting longitudinal movement of the ball screw with respect to the housing.

6. The power assist system of claim 4, wherein the drive pulley, the driven pulley, and the belt are disposed exteriorly of the housing.

7. The power assist system of claim 6, further comprising a cover, wherein the drive pulley, the driven pulley, and the belt are disposed between the cover and the housing.

8. The power assist system of claim 1, further comprising a ball return positioned exteriorly of the ball nut and within a housing of the power assist system.

9. The power assist system of claim 1, wherein the power assist system is disposed within an electric power steering system including a steering gear assembly, wherein rotation of the driven pulley by the drive pulley operates a driven shaft operatively engaged with the steering gear assembly.

10. The power assist system of claim 1, wherein the power assist system is disposed within a brake boost actuator including a master cylinder including a reservoir and a piston, rotation of the ball screw by the driven pulley being converted to linear motion of the piston through the ball nut.

11. A power assist system comprising:
    a motor having a rotor shaft;
    a drive pulley attached to the rotor shaft;
    a driven pulley;
    a flexible belt configured to connect the drive pulley to the driven pulley;
    a ball screw assembly including:
        a rotatable ball screw rotatable with the driven pulley;
        a linearly translated ball nut surrounding the ball screw;
        a plunger attached to the ball nut, the plunger extending along a longitudinal axis of the ball screw; and
        an anti-rotation device arranged to prevent rotation of the ball nut; and
    a driven shaft attached to the ball nut;
    wherein the driven shaft is linearly translated by the ball nut exteriorly of the power assist system and the plunger is configured for attachment to the driven shaft.

12. The power assist system of claim 11, wherein the plunger is linearly translatable with the ball nut, and not rotatable with respect to a housing of the power assist system.

13. A power assist system comprising:
    a motor having a rotor shaft;
    a drive pulley attached to the rotor shaft;
    a driven pulley;
    a flexible belt configured to connect the drive pulley to the driven pulley; and
    a ball screw assembly including:
        a rotatable ball screw rotatable with the driven pulley;
        a linearly translated ball nut surrounding the ball screw; and
        an anti-rotation device arranged to prevent rotation of the ball nut, the anti-rotation device including at least one longitudinally extending vane slidable longitudinally within a housing of the power assist system.

14. A method of linearly translating a driven shaft by a power assist system, the method comprising:
    arranging a pulley assembly including a drive pulley rotatable about a first longitudinal axis, a driven pulley, and a flexible belt configured to connect the drive pulley to the driven pulley;
    connecting the driven pulley to a ball screw for rotating the ball screw with the driven pulley;
    assembling a ball nut with an anti-rotation device on the ball screw; and,
    attaching the driven shaft to the ball nut including connecting a plunger extending from the ball nut to the driven shaft.

15. The method of claim 14, wherein the driven shaft is a piston for a brake boost actuator.

16. The method of claim 14, wherein the driven shaft is operatively engaged with a steering gear assembly.

17. The method of claim 14, wherein arranging the pulley assembly includes arranging the pulley assembly between a housing and a cover of the power assist system.

18. The method of claim 14, wherein the power assist system includes a motor, the motor rotating the drive pulley.

19. The method of claim 14, wherein the driven pulley is rotatable about a second longitudinal axis, and the ball nut linearly translates along the second longitudinal axis.

* * * * *